Feb. 4, 1936.  A. E. JONSSON  2,029,873
APPARATUS FOR PREPARATION OF MALT
Filed May 9, 1933  2 Sheets-Sheet 1
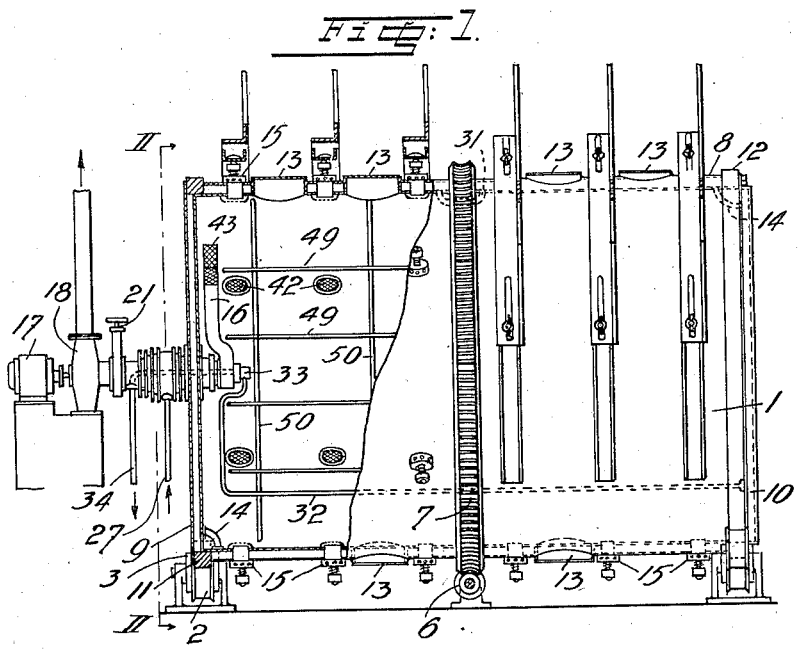
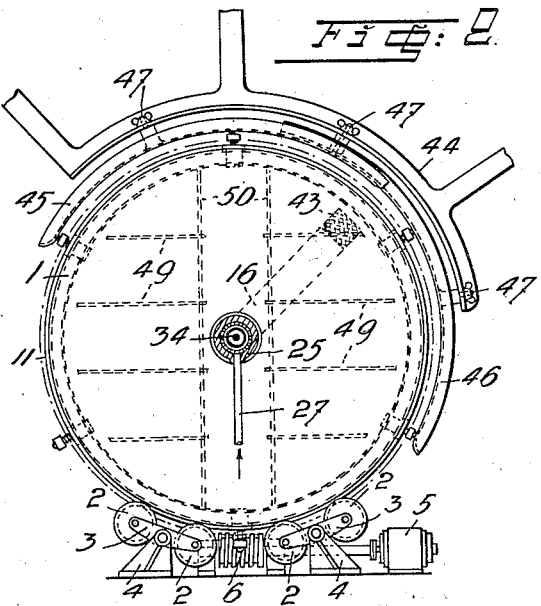
INVENTOR
AUGUSTINUS EDVARD JONSSON
BY Haseltine, Lake & Co
ATTORNEYS Feb. 4, 1936.    A. E. JONSSON    2,029,873
APPARATUS FOR PREPARATION OF MALT
Filed May 9, 1933    2 Sheets-Sheet 2
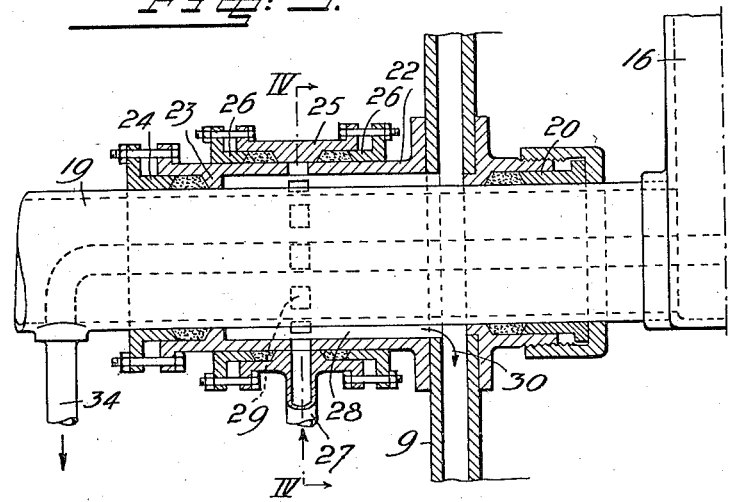
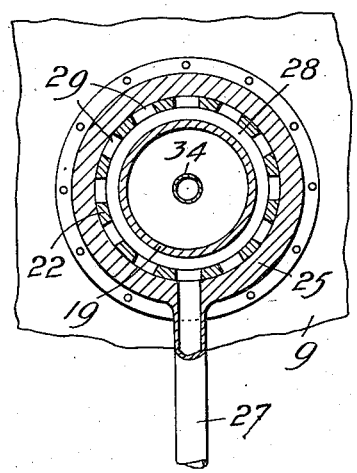
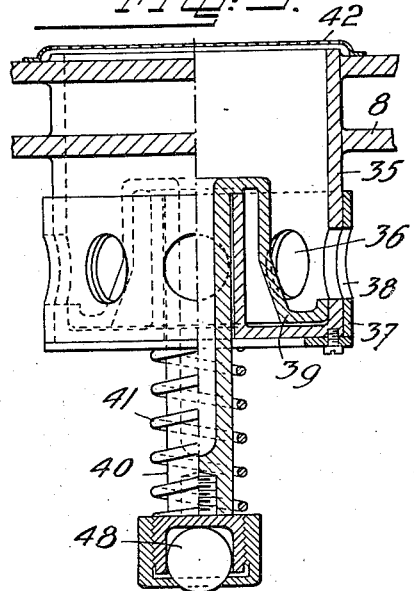
INVENTOR
AUGUSTINUS EDVARD JONSSON
BY Haseltine, Lake & Co.
ATTORNEYS Patented Feb. 4, 1936

2,029,873

UNITED STATES PATENT OFFICE 2,029,873

APPARATUS FOR PREPARATION OF MALT

Augustinus Edvard Jonsson, Stockholm, Sweden

Application May 9, 1933, Serial No. 670,102
In Sweden February 24, 1933

1 Claim. (Cl. 195—22)

This invention relates to an apparatus for germinating and malting grain, with particular reference to cooling of the grain and freeing the same from carbonic acid gas generated without deleteriously drying the grain or in any other manner reducing the germinating qualities thereof.

In the preparation of malt the temperature of the malting material, as is known, must be carefully regulated so that not too strong a heating occurs, which would impair or make impossible the necessary germination and dissolution processes. Hitherto, it was usual to spread the malting material as a layer on a floor or the like, and an undesirable increase of temperature prevented by stirring the material now and then. In the same way the material may be exposed to a sufficient airing, which prevents any increase of heat and at the same time removes formed gases impairing the germination. It is, however, obvious that this method offers great difficulties, is very expensive and will further easily fail, if incessant attention is not paid to the temperature of the material.

To make the above method somewhat cheaper, it has been suggested to carry out the malting in special drums, from which the excess of heat generated during the germination above the proper temperature therefor is removed by passing air through them. Both according to the latter and the former methods, considerably larger quantities of air are necessary than required for the maintenance of the germination and the removal of the formed gases (for example carbon dioxide). This has proved of disadvantage also for the germination process, which will run a more even course and with a greater yield of extract forming substances, if the quantities of air passed through the malting material are limited solely with regard to the maintenance of the germination and the removal of the gases. Hence, due to the fact that the quantity of air passed through the malting material, according to the present invention is limited to a minimum, an excessive drying out of the malting material is also prevented, whereby the well nigh uncontrollable, inefficient and expensive moistening of the malting material becomes unnecessary.

According to the present invention, this is accomplished by removing to a required extent the heat generated during the germination by indirect cooling of the malting material, as already indicated, whereas the gases formed during the malting process, continuously or discontinuously, are removed by passing limited quantities of air solely adapted for this purpose through the malting material, which at the same time is suitably stirred, partly to obtain a homogenous removal of heat from the material, partly to prevent it from felting together. The air introduced according to this invention serves as a scavenging vehicle for carrying off the carbon dioxide formed and thereby maintains the germinating properties of the grain by preventing the same from being killed or choked for lack of oxygen.

The method of the present invention is carried out to the best advantage both from a technical and economical point of view in a drum or other container, provided with cooling elements arranged along the circumference of the container or at its gable ends or projecting into the container or in a way combined in one or several or all of these possibilities.

For airing the material, the drum may be provided with valve controlled air supply openings in such manner that, if a rotating or oscillating drum is used, the openings are kept open for the admittance of air, when they are covered by malting material, but closed when they are disposed above the level of the malting material.

In order to pass the air through the material, the drum may for example be connected to a suction conduit of one kind or another.

Other characteristics of the invention will be more closely set forth in connection with the description of the apparatus shown on the accompanying drawings for carrying out the method.

Fig. 1 shows the apparatus seen from the side and partly in section.

Fig. 2 is a section along line II—II in Fig. 1.

Fig. 3 is a longitudinal section through a detail of the apparatus.

Fig. 4 is a section along line IV—IV in Fig. 3.

Fig. 5 shows an air valve, partly in section.

In the illustrated example the drum 1 is cylindrical and supported by four pairs of rollers 2, which are attached to levers 3, that are pivotally journalled in brackets 4. The drum 1 is arranged in well known manner to obtain an oscillating or rotating motion by means of a motor 5 and a worm gear 6, 7.

According to the invention, the drum 1 is provided with double walls, including both the cylindrical mantle 8 and the heads 9 and 10. Of the latter, the head 9 is firmly connected with the mantle 8, which is strengthened by a ring 11 running around the drum and serving as rolling surface for the rollers 2. Also the opposite end of the drum 1 is provided with a similar strengthening ring 12, but the head 10 is here removably connected with the mantle, for the purpose of providing ready access to the interior of the drum for repairs and the like, when the head 10 is removed. Besides, there are arranged in the mantle a number of charge and discharge openings 13 for the malting material, which openings also serve as manholes.

In the intermediate spaces between the mantle walls and the walls of the heads cooling water is brought to circulate in a manner more specifically described below, and said intermediate spaces communicate with each other by means of pipe conduits 14. In the mantle of the drum there are provided a number of rows of air valves 15, which normally are kept open. Through the fixed head 9 a connection for a hollow arm 16 is passed, which is connected to a fan 18 driven by a motor 17 for the purpose of sucking out the air and the gases formed in the drum during the malting process in a manner described below.

As shown in Fig. 3 the arm 16 is firmly connected to a pipe 19 passed through the head 9, which pipe at the inside of the gable is tightened against it by means of a stuffing box 20. The pipe 19, which is connected to the suction side of the fan 18, is provided with a regulating valve 21 for regulating the quantity of air sucked through the drum.

At the outside of the head 9 a pipe member 22 of greater diameter than the pipe 19 is arranged concentrically around the latter pipe. At its outer end, the pipe member 22 is provided with a flange 23 resting against the pipe 19 and is at this point further tightened by a stuffing box 24. Around the pipe member 22 a ring-shaped member 25 is arranged, which at both ends is tightened against said pipe member by means of stuffing boxes 26. To the annular member 25 a supply pipe 27 for cooling liquid, for example water, is connected, which liquid is conducted to the intermediate space 28 between the pipes 19 and 22 through openings 29 arranged in the latter. From the intermediate space 28, the cooling water is admitted, as indicated by the arrow 30, to the intermediate space between the walls of the head 9, from which the water is conducted by way of the pipe 14 to the intermediate space of the mantle 8, which may be divided in two chambers intercommunicating by a pipe conduit 31. After entering the intermediate space of the head 10 the water is discharged through a pipe conduit 32, which by means of a rotatable joint 33 is connected to the discharge 34 running through the stationary pipe 19. The mentioned pipe 32 assists in cooling as well as stirring the malting material, and may naturally be more elaborate in form to increase the stirring and cooling effects.

The air valves 15 are shown in detail in Fig. 5 and consist of a pipe member 35 passed through the mantle walls, and at its outer end provided with a series of air openings 36. Around the pipe member 35 a sleeve 37 is loosely arranged and provided with openings 38 corresponding to the openings 36. By turning the sleeve 37 in relation to the pipe piece 35, the size of the air openings may be regulated as required. In the pipe member 35 a piston member 39 is slidably arranged and provided with a projecting rod 40, around which a spring 41 is arranged, which normally holds the piston 39 in its uttermost position, wherein the air openings communicate with the interior of the drum. The inner end of the pipe member 35 is covered by a grate 42, for example of perforated sheet metal, partly for the purpose of preventing the contents of the drum from dropping down through the valves, and partly for distributing the admitted air over a larger surface of the malting material. Similarly, the arm 16 is at its upper open end provided with a sieve 43 of a perforated portion.

As already mentioned, the admitted air should pass through the malting material in the drum thoroughly airing it. Therefore, the valves 15 which are disposed below the level of the malting material should be kept open, whereas the valves above them should be kept closed. According to the invention, upon the rotation of the drum an automatic control of the valves is effected by means of cam rails 45 and 46 that are attached to a suitable part 44 of the machine frame and arranged concentrically in relation to the drum. By means of wing nuts 47 the rails may be secured in different retracted or advanced positions. The rails 45, 46 are intended to press the pistons 39 inwards to close the air openings 36, 38 by making contact with balls or rollers 48 arranged on the piston rods 40. Owing to the possible different positions of the rails 45, 46 the time, during which the valves are kept closed, may be adjusted in a simple way.

For stirring the malting material in the drum, stirring members 49 are inserted therein, for instance in the form of plate-like members or shelves running in the longitudinal direction of the drum and which are strengthened by girders or rods 50 arranged at suitable distances apart. Upon the rotation of the drum, the level of the malting material will not be horizontal but assume an inclined position. It has therefore proved suitable, as indicated in Fig. 2, to arrange the arm 16 inclined, and the angle of inclination may be adjustable.

The speed of rotation of the drum is comparatively low and is regulated during the continuance of the malting process, and it has proved suitable to vary the speed of revolution of the drum from one revolution in 20 minutes to one revolution in 10 minutes.

The temperature at which the malting occurs in the drum can, when the present method is used, without difficulty be regulated by means of the cooling water. Its temperature should be kept one degree or a few degrees below the temperature desired in the malting goods. The malting season does not need to be limited to the colder part of the year, but can be extended to embrace also the summer months. The cooling water may, after passing through the intermediate spaces in the drum walls, be conducted to a cooler of a known type, whereupon the water again is admitted to the drum. Of course, one may also continuously admit fresh water of a suitable low temperature to the drum.

Above, only one form of the invention has been described, but it is obvious that the details of the apparatus may be changed within wide limits without departing from the principle of the invention.

Having now particularly described the nature of my invention and the manner of its operation, what I claim is:

Apparatus for carrying out the germination step in the preparation of malt from grain, comprising a malting drum arranged to rotate about a horizontal axis, a plurality of air inlet valves arranged in the wall of the drum and distributed in a number of peripheral rows along the drum, said valves being individually adjustable independently of each other with regard to the area of passage, means for controlling said valves to close and open during the rotation of the drum comprising curved rails extending in the circumferential direction of the drum opposite said rows of valves, means for varying the length of said rails, means for varying the angular position of said rails in relation to the axis of the drum, an air suction conduit leading from the interior of the drum, and means for sucking an air current through said valves, said drum and said air suction conduit.

AUGUSTINUS EDVARD JONSSON.